US012738782B2

(12) United States Patent
Chowdhury et al.

(10) Patent No.: US 12,738,782 B2
(45) Date of Patent: Sep. 15, 2026

(54) ROTOR FOR ELECTRIC MACHINE

(71) Applicant: GM GLOBAL TECHNOLOGY OPERATIONS LLC, Detroit, MI (US)

(72) Inventors: Mazharul Chowdhury, Canton, MI (US); Cheongun Han, Novi, MI (US); Michael C. Muir, Troy, MI (US); Mohammad F. Momen, Rochester Hills, MI (US); Edward L. Kaiser, Orion, MI (US)

(73) Assignee: GM Global Technology Operations LLC, Detroit, MI (US)

(*) Notice: Subject to any disclaimer, the term of this patent is extended or adjusted under 35 U.S.C. 154(b) by 255 days.

(21) Appl. No.: 18/483,237

(22) Filed: Oct. 9, 2023

(65) Prior Publication Data

US 2025/0119009 A1 Apr. 10, 2025

(51) Int. Cl.
*H02K 1/276* (2022.01)
*B60K 6/26* (2007.10)

(52) U.S. Cl.
CPC ................ *H02K 1/276* (2013.01); *B60K 6/26* (2013.01); *B60Y 2200/92* (2013.01); *B60Y 2400/60* (2013.01)

(58) Field of Classification Search
CPC .. B60K 6/26; B60Y 2200/92; B60Y 2400/60; H02K 1/276; H02K 1/2766; H02K 2213/03
USPC .................................................... 310/156.56
See application file for complete search history.

(56) References Cited

U.S. PATENT DOCUMENTS

| | | | | |
|---|---|---|---|---|
| 5,818,140 | A | 10/1998 | Vagati | |
| 6,741,003 | B2 * | 5/2004 | Naito | H02K 1/2766 310/156.56 |
| 7,498,708 | B2 * | 3/2009 | Brown | H02K 1/276 310/156.08 |
| 8,928,197 | B2 * | 1/2015 | Jurkovic | H02K 1/2766 310/156.53 |
| 9,118,230 | B2 * | 8/2015 | Jurkovic | H02K 1/2706 |
| 9,130,422 | B2 * | 9/2015 | Rahman | H02K 1/02 |
| 9,621,001 | B2 * | 4/2017 | Kaiser | H02K 1/2766 |
| 9,705,388 | B2 * | 7/2017 | Melfi | H02K 21/46 |
| 9,712,006 | B2 * | 7/2017 | Kondou | H02K 1/2766 |
| 10,284,036 | B2 * | 5/2019 | Hao | H02K 21/14 |
| 10,523,099 | B2 * | 12/2019 | Haussmann | H02K 15/12 |
| 10,886,802 | B2 * | 1/2021 | Kim | H02K 7/14 |
| 2009/0224624 | A1 * | 9/2009 | Kumar | H02K 1/246 310/156.53 |
| 2013/0270957 | A1 * | 10/2013 | Jurkovic | H02K 1/2766 310/156.38 |
| 2015/0084452 | A1 * | 3/2015 | Rahman | H02K 1/2706 310/156.57 |
| 2018/0241265 | A1 * | 8/2018 | Hosoda | H02K 1/2766 |

(Continued)

FOREIGN PATENT DOCUMENTS

DE 102014201740 A1 8/2014

*Primary Examiner* — Alex W Mok
(74) *Attorney, Agent, or Firm* — Quinn IP Law

(57) ABSTRACT

A rotor for an electric machine including a rotor core having a plurality of circumferentially spaced rotor poles. Each rotor pole may include a plurality of rotor slots arranged into one or more magnetic layers and one or more non-magnetic layers. The magnetic layers may include a magnet within one or more of the rotor slots thereof and the non-magnetic layers including no magnets within the rotor slots thereof.

16 Claims, 5 Drawing Sheets

(56) References Cited

U.S. PATENT DOCUMENTS

| | | | | |
|---|---|---|---|---|
| 2019/0207441 | A1* | 7/2019 | Takeuchi | H02K 19/103 |
| 2019/0252935 | A1 | 8/2019 | Kim et al. | |
| 2020/0153297 | A1* | 5/2020 | Zhou | B60K 1/00 |
| 2020/0303977 | A1* | 9/2020 | Teufel | H02K 1/2766 |
| 2021/0099034 | A1* | 4/2021 | Fatemi | H02K 3/28 |
| 2022/0166274 | A1* | 5/2022 | Michaelides | H02K 1/278 |

* cited by examiner

ROTOR FOR ELECTRIC MACHINE

INTRODUCTION

The present disclosure relates to rotors utilized in electric machines, such as but not necessarily limited to rotors operable with permanent magnet assisted synchronous reluctance machines.

Rare-Earth (RE), Heavy Rare-Earth (HRE) and/or other types of permanent magnets capable of providing persistent magnetic fields may be incorporated into rotors to maximize performance. As more and more vehicles may be employing electric machines, or more specifically electric motors, the materials employed in fabricating or otherwise making use of such permanent magnets may become limited.

SUMMARY

One non-limiting aspect of the present disclosure relates to a rotor for an electric machine having an advantageous construction whereby the performance benefits associated with the use of permanent magnets may be employed in a manner that minimizes materials, resources, etc. consumed in fabricating or otherwise making use of the permanent magnets.

One non-limiting aspect of the present disclosure relates to a rotor for an electric machine. The rotor may include a rotor core having a plurality of circumferentially spaced rotor poles, with each rotor pole including a plurality of rotor slots arranged into one or more magnetic layers and one or more non-magnetic layers. The magnetic layers may include a magnet within one or more of the rotor slots thereof and the non-magnetic layers including no magnets within the rotor slots thereof.

A centerline of each of the magnetic layers and a centerline of each of the non-magnetic layers radially may align with a centerline of the rotor pole corresponding therewith.

An apex of each of the magnetic layers may be radially inboard of an apex of each of the non-magnetic layers. The apexes of the magnetic and non-magnetic layers may be centered relative to the centerline of the rotor pole corresponding therewith.

The rotor slots of the non-magnetic layers may include a center rotor slot, a first outer rotor slot, and a second outer rotor slot. A first center end of the center rotor slot may be separated from the first outer rotor slot with a first side web and a second center end of the center rotor slot may be separated from the second outer rotor slot with a second side web. The first and second side webs may be part of the rotor core.

A first perimeter end of the first outer rotor slot may be separated from an outer perimeter of the rotor core with a first outer bridge and a first interior end of the first outer rotor slot is separated from the center rotor slot with the first side web.

A second perimeter end of the second outer rotor slot may be separated from the outer perimeter with a second outer bridge and a second interior end of the second outer rotor slot is separated from the center rotor slot with the second side web.

Each of the rotor poles may include a first non-magnetic layer and a second non-magnetic layer of the non-magnetic layers, and the apex of each of the first non-magnetic layers is outboard of the apex of each of the second non-magnetic layers.

The first outer, second outer, and center rotor slots of the first non-magnetic layers may have a first parabolically shaped thickness defined relative to a vertex, and the first outer, second outer, and center rotor slots of the second non-magnetic layers have a second parabolically shaped thickness defined relative to the vertex.

The first and second parabolically shaped thicknesses may be approximately equal.

A thickness of the first side web of the first non-magnetic layer may be thinner than a thickness of the first side web of the second non-magnetic layer, and a thickness of the second side web of the first non-magnetic layer may be thinner than a thickness of the second side web of the second non-magnetic layer.

A thickness of the first outer bridge of the first non-magnetic layer may be thinner than a thickness of the first outer bridge of the second non-magnetic layer, and a thickness of the second outer bridge of the first non-magnetic layer may be thinner than a thickness of the second outer bridge of the second non-magnetic layer.

The rotor slots of the magnetic layers may include a middle rotor slot, a first intermediary rotor slot, a second intermediary rotor slot, a first outside rotor slot, and a second outside rotor slot. A first middle end of the middle rotor slot may be separated from the first intermediary rotor slot with a first intermediary web and a second middle end of the middle rotor slot may be separated from the second intermediary rotor slot with a second intermediary web.

A first intermediary end of the first intermediary rotor slot may be separated from a first inside end of the first outside rotor slot with a first outside web and a first middle end of the first intermediary rotor slot is separated from the middle rotor slot with the first intermediary web. A second intermediary end of the second intermediary rotor slot may be separated from a second inside end of the second outside rotor slot with a second outside web and a second middle end of the second intermediary rotor slot may be separated from the middle rotor slot with the second intermediary web.

A first outside end of the first outside rotor slot may be separated from the outer perimeter with a first outside bridge, and a second outside end of the second rotor slot may be separated from the outer perimeter with a second outside bridge.

Each of the rotor poles may include a third magnetic layer, a fourth magnetic layer, and a fifth magnetic layer of the magnetic layers, and the apex of each of the third magnetic layers may be outboard of the apex of each of the fourth magnetic layers and the apex of each of the fourth magnetic layers may be outboard of the apex of each of the fifth magnetic layers.

The magnets may be included within each of the middle rotor slots and no magnets are included within any one of the first outside, second outside, first intermediary, and second intermediary rotor slots.

The first outside, second outside, first intermediary, and second intermediary rotor slots of the third magnetic layers may have a third parabolically shaped thickness defined relative to a vertex. The first outside, second outside, first intermediary, and second intermediary rotor slots of the fourth magnetic layers may have a fourth parabolically shaped thickness defined relative to the vertex. The first outside, second outside, first intermediary, and second intermediary rotor slots of the fifth magnetic layers may have a fifth parabolically shaped thickness defined relative to the vertex.

The middle rotor slots of the third magnetic layers have a third rectangular shape, the middle rotor slots of the fourth magnetic layers may have a fourth rectangular shape, and the middle rotor slots of the fifth magnetic layers may have a fifth rectangular shape.

A thickness of each of the third, fourth, and fifth rectangular shapes may be approximately equal, and optionally a width of each of the third rectangular shapes may be narrower than a width of each of the fourth rectangular shapes and the width of each of the fourth rectangular shape is narrower than a width of each of the fifth rectangular shape.

One non-limiting aspect of the present disclosure relates to a rotor for an electric machine. The rotor may include a rotor core having a plurality of circumferentially spaced rotor poles, with each rotor pole including a plurality of rotor slots arranged into a plurality of layers. The plurality of layers may include: a first non-magnetic layer having the rotors slots thereof shaped to include a center rotor slot, a first outer rotor slot, and a second outer rotor slot; a second non-magnetic layer having the rotor slots thereof shaped to include a center rotor slot, a first outer rotor slot, and a second outer rotor slot; a third magnetic layer having the rotor slots thereof shaped to include a middle rotor slot, a first intermediary rotor slot, a second intermediary rotor slot, a first outside rotor slot, and a second outside rotor slot; a fourth magnetic layer having the rotor slots thereof shaped to include a middle rotor slot, a first intermediary rotor slot, a second intermediary rotor slot, a first outside rotor slot, and a second outside rotor slot; and a fifth magnetic layer having the rotor slots thereof shaped to include a middle rotor slot, a first intermediary rotor slot, a second intermediary rotor slot, a first outside rotor slot, and a second outside rotor slot. The first and second non-magnetic layers may include no magnets, and the third, fourth, and fifth magnetic layers may include a magnet in each of the middle rotor slots.

One non-limiting aspect of the present disclosure relates to a vehicle. The vehicle may include an electric motor configured for converting electrical power to mechanical power for purposes of propelling the vehicle. The electric motor may includes a stator including a plurality of stator windings configured for generating a rotating magnetic field (RMF) and a rotor configured for rotating within the stator according to a torque induced by the RMF. The rotor may include a rotor core having a plurality of circumferentially spaced rotor poles, with each rotor pole including a plurality of rotor slots arranged into one or more magnetic layers and one or more non-magnetic layers. The magnetic layers may include a magnet within one or more of the rotor slots thereof and the non-magnetic layers including no magnets within the rotor slots thereof.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
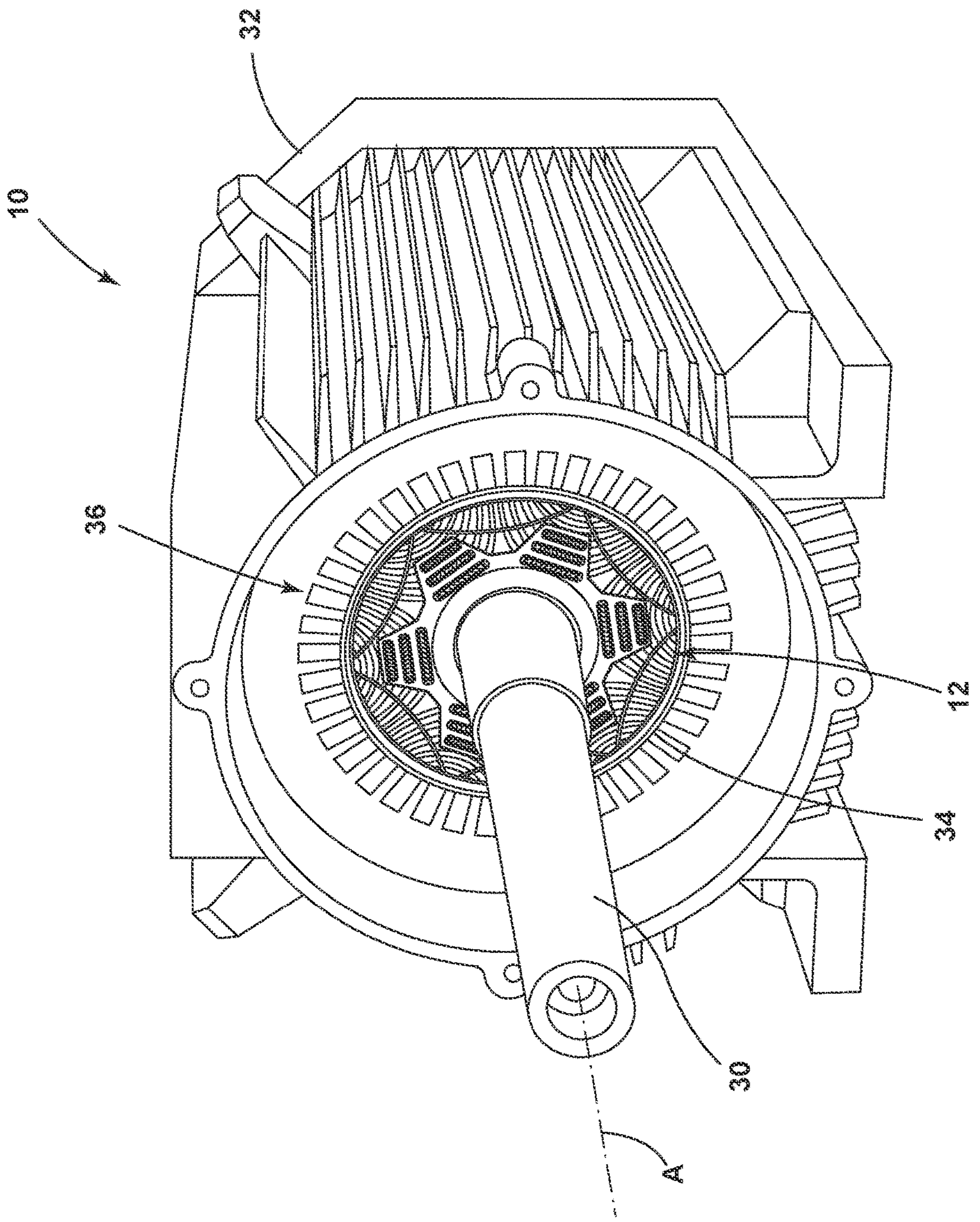
FIG. 1 illustrates a schematic view of an electric machine in accordance with one non-limiting aspect of the present disclosure.
Figure 2:
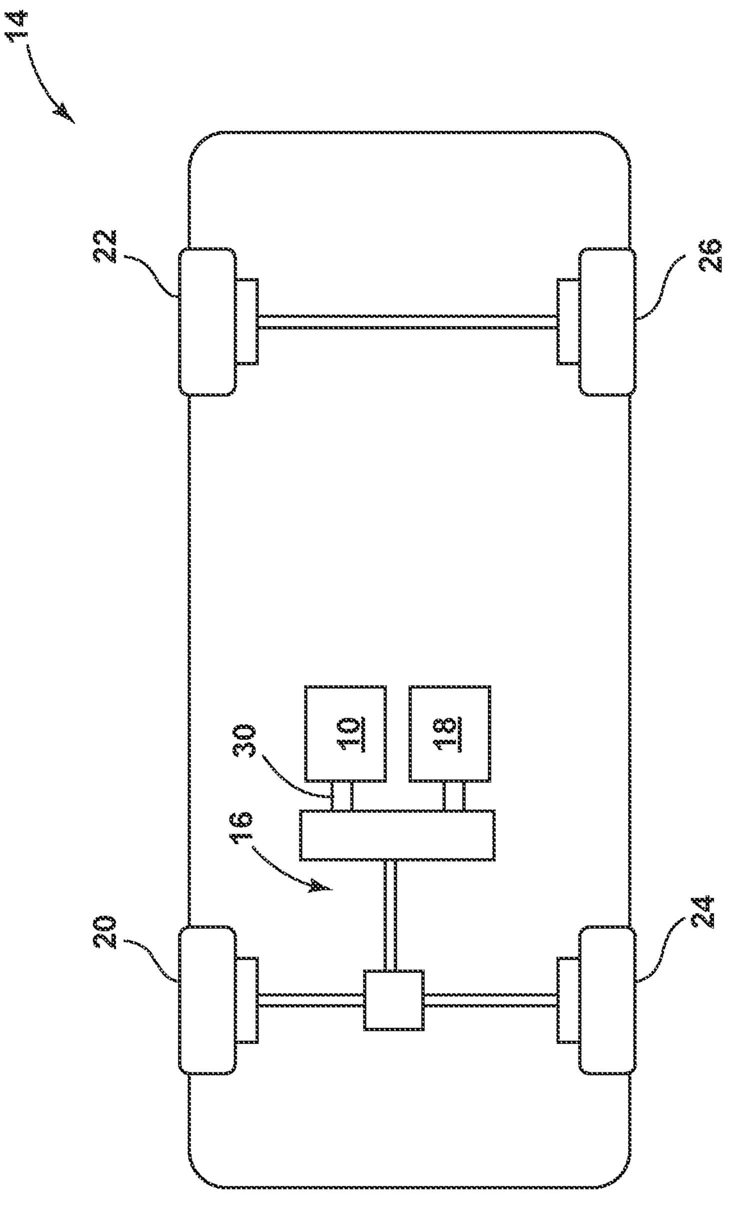
FIG. 2 illustrates a schematic view of a vehicle having an electric machine in accordance with one non-limiting aspect of the present disclosure.

FIG. 1 illustrates a schematic view of an electric machine 10 in accordance with one non-limiting aspect of the present disclosure. The electric machine 10 may be of the type employing a rotor 12 to impart mechanical force to a load in proportion to an electrical excitation thereof and/or to generate electrical energy in response to the rotation thereof. The electric machine 10, at least in the illustrated configuration, may be referred to as an electric motor 10 operable for propelling a vehicle and/or regenerative braking. FIG. 2 illustrates a schematic view of a vehicle 14 having the electric motor 10 in accordance with one non-limiting aspect of the present disclosure. The electric motor 10 may be employed within the vehicle 14 to facilitate imparting mechanical force to a propulsion system, powertrain, or drivetrain 16 operable for propelling or otherwise driving the vehicle 14. The vehicle 14 is illustrated as a hybrid type due to the powertrain 12 optionally including an internal combustion engine (ICE) 18. The powertrain 16 may include a transmission, a driveshaft, a differential, axles and/or other componentry to facilitate conveying rotative force from a rotor shaft 30 coupled with the rotor 10 (see FIG. 1) to the wheels 20, 22, 24, 26. The vehicle 14 is shown to include the powertrain 12 operable with the front wheels 20, 24 for non-limiting purposes as the present disclosure fully contemplates its use and application with four-wheel drive automobiles and other, non-automobile types of vehicles.

Returning to FIG. 1, the electric motor 10 may include a housing 32 configured to support a rearward end (not shown) of the rotor shaft 30 while permitting the rotor 10 to rotate within an airgap 34 relative to a stator 36. The stator 36 may be disposed annularly around the rotor 10 for purposes of generating a rotating magnetic field (RMF), which as one skilled in the art may appreciate, may be used to impart a rotational torque sufficient for rotating the rotor 10. While not shown in detail, the stator 36 may include stator windings or other features capable of being electrically excited for purposes of controlling the RMF and the resulting rotation of the rotor 10. The rotor 10, as shown in the schematic, end view of FIG. 3, may include a plurality of Rare-Earth (RE), Heavy Rare-Earth (HRE) and/or other types of permanent magnets 40 capable of providing persistent magnetic fields, which may be simply referred to as magnets 40. One non-limiting aspect of the present disclosure contemplates the rotor 10 being formed with the generally annular shape from a plurality of laminations stack in a side-by-side facing relationship axially along an access of rotation A, with each lamination optionally including the rotor 10 configuration shown in FIG. 3. The rotor 10 may be advantageously constructed in this manner to obtain the performance benefits associated with the use of such magnets 40 while also minimizing the materials, resources, etc. consumed in fabricating or otherwise making use of the magnets 40.

Figure 3:
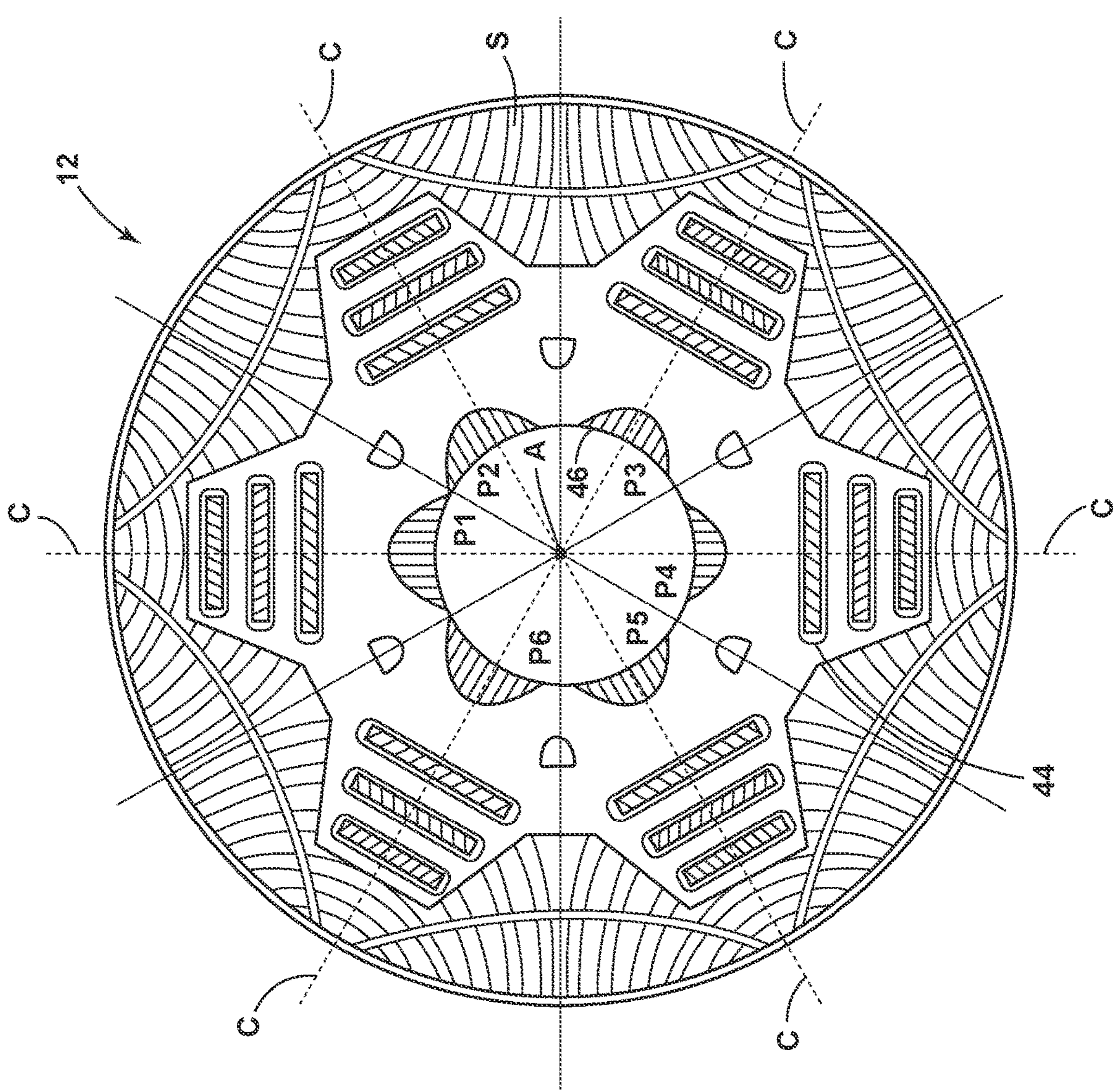
FIG. 3 illustrates a schematic view of a rotor lamination in accordance with one non-limiting aspect of the present disclosure.
Figure 4:
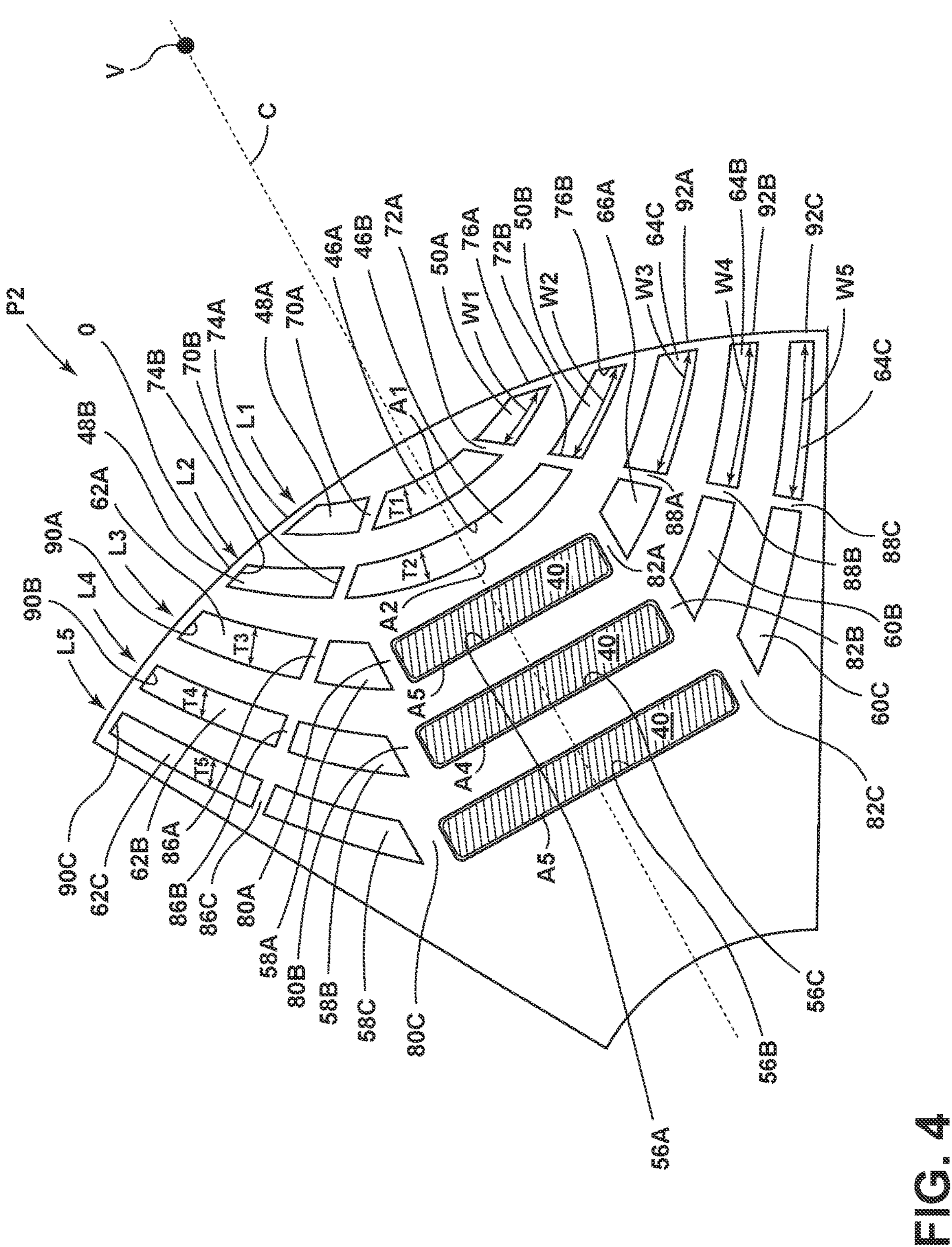
FIG. 4 illustrates a fragmentary a schematic fragmentary view of one of a rotor pole in accordance with one non-empty aspect of the present disclosure.

FIG. 3 may be representational of one lamination of the rotor 10 such that multiple, optionally identical laminations may be stacked together to form an entirety of the rotor 10. The rotor 10 may be formed out of steel or other suitable material to include a rotor core 44 having a plurality of rotor slots S and an arcuate shaped inner surface 46 configured for coupling with the rotor shaft 30. The inner surface 46 may optionally be formed with differing shapes or configurations depending on a desired coupling with the rotor shaft 30 or other load placed thereupon. The rotor 10 is shown to be constructed with six circumferentially spaced rotor poles P1, P2, P3, P4, P5, P6 having a centerline C centered relative to the magnets 40 in what may be referred to as a six-pole configuration. This is done for non-limiting purposes as the present disclosure fully contemplates the rotor 10 being similarly constructed to support configurations have more or less rotor poles P1, P2, P3, P4, P5, P6. FIG. 4 illustrates a fragmentary a schematic fragmentary view of one of the rotor poles P2 in accordance with one non-empty aspect of the present disclosure. Each of the rotor 10 poles may be constructed in a similar manner, i.e., with the rotor slots S arranged into a plurality of layers L. While the use of more or less layers L is contemplated, the illustrated use of a first layer L1, a second layer L2, a third layer L3, a fourth layer L4, and a fifth layer L5 is believed to be beneficial in balancing the performance gains provided with the magnets 40 relative to the materials, resources, etc. consumed in fabricating or otherwise making use thereof.

The first and second layers L1, L2 may each include a center rotor slot 46A, 46B, a first outer rotor slot 48A, 48B, and a second outer rotor slot 50A, 50B. The first and second layers L1, L2 may be referred to as non-magnetic layers due to the rotor 10 slots including no magnets 40. Each of the rotor slots 46A, 46B, 48A, 48B, 50A, 50B of the first and second, non-magnet layers L1, L2 may be airgaps or voids incorporated within the rotor core 44. The third, fourth, and fifth layers L3, L4, L5 may each include a middle rotor slot 56A, 56B, 56C, a first intermediary rotor slot 58A, 58B, 58C, a second intermediary rotor slot 60A, 60B, 60C, a first outside rotor slot 62A, 62B, 62C, and a second outside rotor slot 64A, 64B, 64C. The third, fourth, and fifth layers L3, L4, L5 may be referred to as magnetic layers due to the inclusion of magnets 40 within one or more of the rotor slots thereof, which for exemplary purposes are shown to correspond with magnets being included within the middle rotor slots 56A, 56B, 56C. Similarly to the first and second layers L1, L2, the remaining rotor slots 58A, 58B, 58C, 60A, 60B, 60C, 62A, 62B, 62C, 64A, 64B, 64C of the third, fourth, and fifth layers L3, L4, L5 may be air gaps or voids in the rotor 10 having no magnets 40. An apex or most radially inward point A1, A2, A3, A4, A5 of each of the layers L1, L2, L3, L4, L5 may be centered relative to the centerline of the corresponding pole P1, P2, P3, P4, P5, P6, which in the illustrated configuration includes an apex A5 of the fifth layer L5 being inboard of an apex A4 of the fourth layer L4, the apex A4 of the fourth layer L4 being inboard of an apex A3 of the third layer L3, the apex A3 of the third layer L3 being inboard of the apex A2 of the second layer L2, and the apex A2 of the second layer L2 being inboard of an apex A1 of the first layer L1.

With respect to the non-magnetic layers, a first center end of the center rotor slot 46A, 46B may be separated from the first outer rotor slot 48A, 48B with a first side web 70A, 70B and a second center end of the center rotor slot 46A, 46B may be separated from the second outer rotor slot 50A, 50B with a second side web 72A, 72B. The first and second side webs 70A, 70B, 72A, 72B may be constructed in this manner as part of the rotor core 44. A first perimeter end of the first outer rotor slot 48A, 48B may be separated from an outer perimeter O of the rotor core 44 with a first outer bridge 74A, 74B and a first interior end of the first outer rotor slot is separated from the center rotor slot 46A, 46B with the first side web 70A, 70B. A second perimeter end of the second outer rotor slot 50A, 50B may be separated from the outer perimeter O with a second outer bridge 76A, 76B and a second interior end of the second outer rotor slot 46A, 46B may be separated from the center rotor slot with the second side web. The first and second outer bridges 74A, 74B, 76A, 76B may be constructed in this manner as part of the rotor core 44. The rotor 10, or more specifically each rotor core laminations stacked together as part of the rotor 10, may be individually shaped into the illustrated construction, such as through a stamping or other manufacturing processes whereby the rotor 10 slots may be carved from a single sheet of material comprising the rotor core 44 lamination.

With respect to the magnetic layers L3, L4, L5, a first middle end of the middle rotor slot 56A, 56B, 56C may be separated from the first intermediary rotor slot 58A, 58B, 58C with a first intermediary web 80A, 80B, 80C and a second middle end of the middle rotor slot 56A, 56B, 56C may be separated from the second intermediary rotor slot 60A, 60B, 60C with a second intermediary web 82A, 82B, 82C. The first and second intermediary webs 80A, 80B, 80C, 82A, 82B, 82C may be constructed in this manner as part of the rotor core 44. A first intermediary end of the first intermediary rotor slot 58A, 58B, 58C may be separated from a first inside end of the first outside rotor slot 62A, 62B, 62C with a first outside web 86A, 86B, 86C and a first middle end of the first intermediary rotor slot 58A, 58B, 58C may be separated from the middle rotor slot 56A, 56B, 56C with the first intermediary web 80A, 80B, 80C. A second intermediary end of the second intermediary rotor slot 60A, 60B, 60C may be separated from a second inside end of the second outside rotor slot 64A, 64B, 64C with a second outside web 88A, 88B, 88C and a second middle end of the second intermediary rotor slot 60A, 60B, 60C may be separated from the middle rotor slot with the second intermediary web 82A, 82B, 82C. The first and second outside webs 86A, 86B, 86C, 88A, 88B, 88C may BE constructed in this manner as part of the rotor core 44. A first outside end of the first outside rotor slot 62A, 62B, 62C may be separated from the outer perimeter O with a first outside bridge 90A, 90B, 90C. A second outside end of the second outside rotor slot 64A, 64B, 64C may be separated from the outer perimeter 0 with a second outside bridge 92A, 92B, 92C. The first and second outside bridges 90A, 90B, 90C, 92A, 92B, 92C may be constructed in this manner as part of the rotor core 44.

The proposed rotor design, as described, may utilize multiple different magnets 40 (material properties, shape, or size) to form certain magnetic poles in a PM synchronous machine 10. Magnet discretization may be equal or unequal in size and magnets 40 may be included differently in different layers of different rotor laminations i.e., the magnets 40 may be dispersed throughout the layers L1, L2, L3, L4, L5 and/or the layers L1, L2, L3, L4, L5 themselves may be configured differently than the illustrated manner for other laminations stacked together as part of the rotor 10. The shapes and sizing of the rotor slots, webs and bridges may similarly vary across different layers L1, L2, L3, L4, L5 or be the same depending on their locations in the rotor core 44 and the resulting influence on optimizing both electromagnetics and mechanical integrity. The proposed rotor 12, and thereby the resulting electric machine 10, may utilize different types and shapes of magnets 40 to improve the electromagnetic performance of the machine 10, such as to achieve average torque and lower torque ripple. The empty rotor slots, i.e., the rotor slots lacking magnets 40, may be designed and incorporate so as to act as air barriers close to an outer perimeter or radius of the rotor core 44, which may be beneficially in improving the demagnetization performance and thereby limit HRE contents in the rotor 10, which may optionally permit or enable the used of non-HRE grade magnets 40.

While the present disclosure contemplates a wide variety of configurations, shapes, sizes, orientations, and the like for the rotor slots, the illustrated use of generally parabolically magnetic and non-magnetic layers L1, L2, L3, L4, L5 is believed to be particularly beneficial to the outboard non-magnetic layers providing flux barriers and other performance enhancements that help to minimize use of the magnets 40. The first outer 48A, second outer 50A, and center rotor slots 46A of the first non-magnetic layer L1 may have a first parabolically shaped thickness T1 defined relative to a vertex V, and the first outer 48B, second outer 50B, and center rotor slots 46B of the second non-magnetic layer L2 may have a second parabolically shaped thickness T2 defined relative to the vertex V. The first and second parabolically shaped thicknesses T1, T1 are shown to be approximately equal in proportion to each other, with a width W1, W2 thereof varying in illustrated manner based on relative distance to the vertex V. A thickness of the first side web 70A of the first non-magnetic layer L1 may be thinner than a thickness of the first side web 70B of the second non-magnetic layer L2, and a thickness of the second side web 72A of the first non-magnetic layer L1 may be thinner than a thickness of the second side web 72B of the second non-magnetic layer L2. Likewise, a thickness of the first outer bridge 74A of the first non-magnetic layer L1 may be thinner than a thickness of the first outer bridge 74B of the second non-magnetic layer L2, and a thickness of the second outer bridge 76A of the first non-magnetic layer L1 may be thinner than a thickness of the second outer bridge 76B of the second non-magnetic layer L2.

The first outside 62A, second outside 64A, first intermediary 58A, and second intermediary rotor 60A slots of the third magnetic layers L3 may have a third parabolically shaped thickness T3 defined relative to the vertex V, the first outside 62B, second outside 64B, first intermediary 58B, and second intermediary rotor 60B slots of the fourth magnetic layer L4 may have a fourth parabolically shaped thickness T4 defined relative to the vertex V, and the first outside 62C, second outside 64C, first intermediary 58C, and second intermediary rotor 60C slots of the fifth magnetic layer L5 may have a fifth parabolically shaped thickness T5 defined relative to the vertex V. The third, fourth, and fifth parabolically shaped thicknesses T3, T4, T5 are shown to be approximately equal in proportion to each other, with a width W3, W4, W5 thereof varying in the illustrated manner based on relative distance to the vertex V. The middle rotor slot 56A of the third magnetic layer L3 may have a third rectangular shape, the middle rotor slot 56B of the fourth magnetic layer L4 have a fourth rectangular shape, and the middle rotor slot 56C of the fifth magnetic layer L5 have a fifth rectangular shape. A thickness of each of the third, fourth, and fifth rectangular shapes may be approximately equal, as shown, with a width of the third rectangular shape optionally being narrower than a width of each of the fourth rectangular shapes and the width of the fourth rectangular shape optionally being narrower than a width of the fifth rectangular shape.

Figures 5, 6, 7:
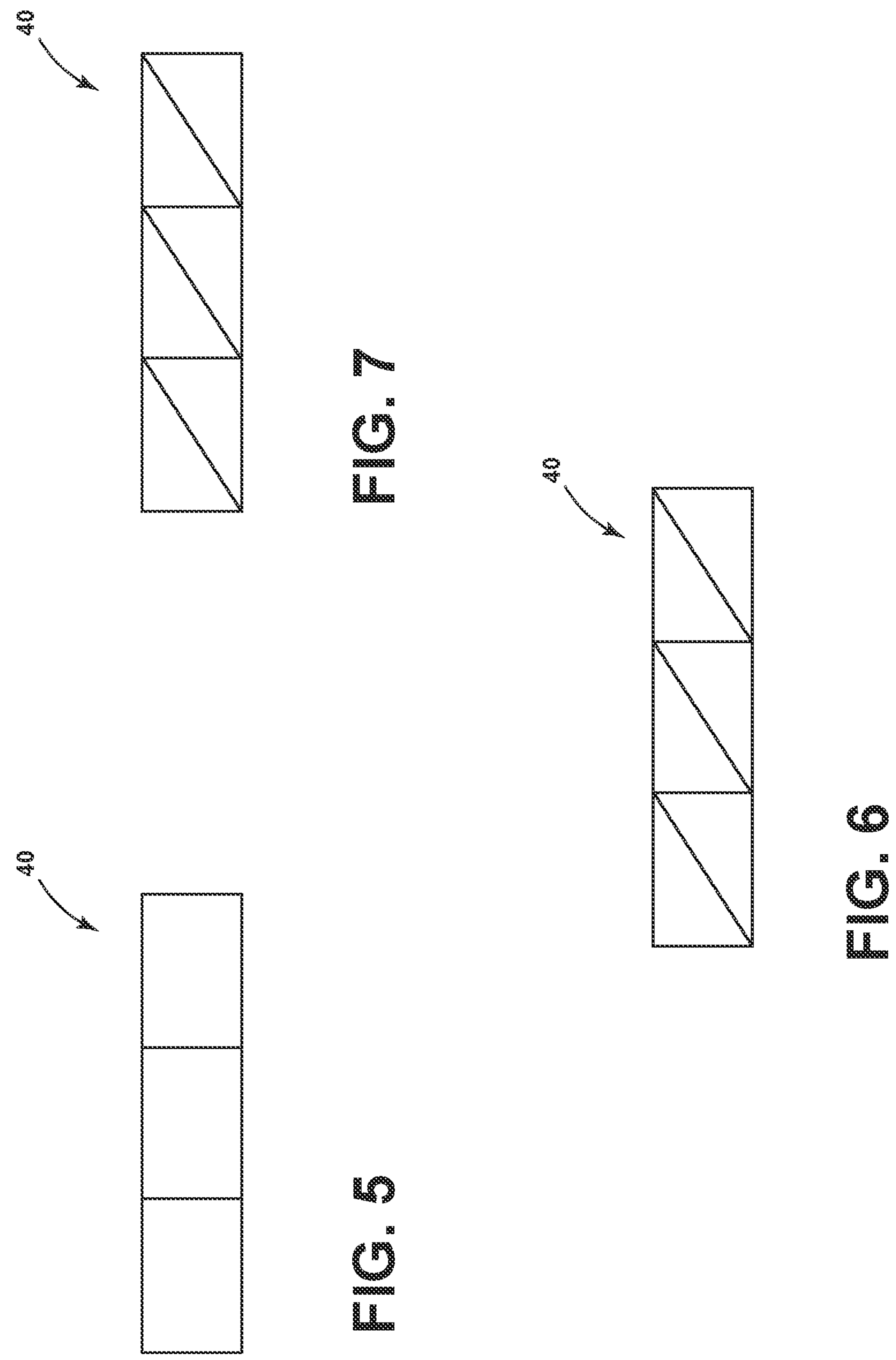
FIG. 5 illustrates a schematic view of a magnet having rectangular pieces in accordance with one non-limiting aspect of the present disclosure.
FIG. 6 illustrates a schematic view of a magnet having triangular pieces in accordance with one non-limiting aspect of the present disclosure.
FIG. 7 illustrates a schematic view of a magnet having triangular and trapezoidal pieces in accordance with one non-limiting aspect of the present disclosure.

The magnets 40 are shown to be proportionally size relative to the corresponding middle rotor slot, i.e., with each a width, a thickness, and a depth approximately equal to the corresponding middle rotor slot. This is done for non-limiting purposes of the present disclosure fully contemplates the magnets 40 having other configurations. FIG. 5 illustrates a schematic view of the magnets 40 comprising individual rectangular pieces in accordance with one non-limiting aspect of the present disclosure. FIG. 6 illustrates a schematic view of the magnets 40 comprising individual triangular pieces in accordance with one non-limiting aspect of the present disclosure. FIG. 7 illustrates the magnets 40 comprising triangular and trapezoidal pieces in accordance with one non-limiting aspect of the present disclosure. The use of magnets 40 comprised of a plurality of magnetic pieces may be advantageous in minimizing the size of each of the magnets 40, i.e., rather than having the larger magnets 40 shown in FIG. 4, the magnets 40 in FIGS. 5-7 may be individually of a relatively smaller size.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items. The term “any of” is understood to include any possible combination of referenced items, including “any one of” the referenced items. “A”, “an”, “the”, “at least one”, and “one or more” are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term “about” whether or not “about” actually appears before the value. A component that is “configured to” perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A rotor for an electric machine, comprising:

a rotor core having a plurality of circumferentially spaced rotor poles, with each rotor pole including a plurality of rotor slots arranged into one or more magnetic layers and one or more non-magnetic layers, the magnetic layers including a magnet within one or more of the rotor slots thereof and the non-magnetic layers including no magnets within the rotor slots thereof;

wherein:

a centerline of each of the magnetic layers and a centerline of each of the non-magnetic layers radially align with a centerline of the rotor pole corresponding therewith;

an apex of each of the magnetic layers is radially inboard of an apex of each of the non-magnetic layers, wherein the apexes of the magnetic and non-magnetic layers are centered relative to the centerline of the rotor pole corresponding therewith;

each of the rotor poles includes a first non-magnetic layer and a second non-magnetic layer of the non-magnetic layers;

the apex of each of the first non-magnetic layers is outboard of the apex of each of the second non-magnetic layers;

the rotor slots of the non-magnetic layers include a center rotor slot, a first outer rotor slot, and a second outer rotor slot;

the first outer, second outer, and center rotor slots of the first non-magnetic layers have a first parabolically shaped thickness defined relative to a vertex; and the first outer, second outer, and center rotor slots of the second non-magnetic layers have a second parabolically shaped thickness defined relative to the vertex.

2. The rotor according to claim 1, wherein a first center end of the center rotor slot is separated from the first outer rotor slot with a first side web and a second center end of the center rotor slot is separated from the second outer rotor slot with a second side web, wherein the first and second side webs are part of the rotor core.

3. The rotor according to claim 2, wherein:

a first perimeter end of the first outer rotor slot is separated from an outer perimeter of the rotor core with a first outer bridge and a first interior end of the first outer rotor slot is separated from the center rotor slot with the first side web, wherein the first outer bridge is part of the rotor core; and a second perimeter end of the second outer rotor slot is separated from the outer perimeter with a second outer bridge and a second interior end of the second outer rotor slot is separated from the center rotor slot with the second side web, wherein the second outer bridge is part of the rotor core.

4. The rotor according to claim 3, wherein:

a thickness of the first outer bridge of the first non-magnetic layer is thinner than a thickness of the first outer bridge of the second non-magnetic layer; and a thickness of the second outer bridge of the first non-magnetic layer is thinner than a thickness of the second outer bridge of the second non-magnetic layer.

5. The rotor according to claim 2, wherein:

a thickness of the first side web of the first non-magnetic layer is thinner than a thickness of the first side web of the second non-magnetic layer; and a thickness of the second side web of the first non-magnetic layer is thinner than a thickness of the second side web of the second non-magnetic layer.

6. The rotor according to claim 1, wherein:

the first and second parabolically shaped thicknesses are approximately equal.

7. The rotor according to claim 1, wherein:

the rotor slots of the magnetic layers include a middle rotor slot, a first intermediary rotor slot, a second intermediary rotor slot, a first outside rotor slot, and a second outside rotor slot, wherein a first middle end of the middle rotor slot is separated from the first intermediary rotor slot with a first intermediary web and a second middle end of the middle rotor slot is separated from the second intermediary rotor slot with a second intermediary web, wherein the first and second intermediary webs are part of the rotor core.

8. The rotor according to claim 7, wherein:

a first intermediary end of the first intermediary rotor slot is separated from a first inside end of the first outside rotor slot with a first outside web and a first middle end of the first intermediary rotor slot is separated from the middle rotor slot with the first intermediary web, wherein the first outside web is part of the rotor core; and a second intermediary end of the second intermediary rotor slot is separated from a second inside end of the second outside rotor slot with a second outside web and a second middle end of the second intermediary rotor slot is separated from the middle rotor slot with the second intermediary web, wherein the second outside web is part of the rotor core.

9. The rotor according to claim 8, wherein:

a first outside end of the first outside rotor slot is separated from an outer perimeter of the rotor core with a first outside bridge, wherein the first outside bridge is part of the rotor core; and a second outside end of the second rotor slot is separated from the outer perimeter with a second outside bridge, wherein the second outside bridge is part of the rotor core.

10. The rotor according to claim 9, wherein:

each of the rotor poles includes a third magnetic layer, a fourth magnetic layer, and a fifth magnetic layer of the magnetic layers; and the apex of each of the third magnetic layers is outboard of the apex of each of the fourth magnetic layers and the apex of each of the fourth magnetic layers is outboard of the apex of each of the fifth magnetic layers.

11. The rotor according to claim 10, wherein:

the magnets are included within each of the middle rotor slots and no magnets are included within any one of the first outside, second outside, first intermediary, and second intermediary rotor slots.

12. The rotor according to claim 11, wherein:

the first outside, second outside, first intermediary, and second intermediary rotor slots of the third magnetic layers have a third parabolically shaped thickness defined relative to a vertex;

the first outside, second outside, first intermediary, and second intermediary rotor slots of the fourth magnetic layers have a fourth parabolically shaped thickness defined relative to the vertex; and the first outside, second outside, first intermediary, and second intermediary rotor slots of the fifth magnetic layers have a fifth parabolically shaped thickness defined relative to the vertex.

13. The rotor according to claim 12, wherein:

the middle rotor slots of the third magnetic layers have a third rectangular shape;

the middle rotor slots of the fourth magnetic layers have a fourth rectangular shape; and the middle rotor slots of the fifth magnetic layers have a fifth rectangular shape.

14. The rotor according to claim 13, wherein:

a thickness of each of the third, fourth, and fifth rectangular shapes are approximately equal; and a width of each of the third rectangular shapes is narrower than a width of each of the fourth rectangular shapes and the width of each of the fourth rectangular shape is narrower than a width of each of the fifth rectangular shape.

15. A rotor for an electric machine, comprising:

a rotor core having a plurality of circumferentially spaced rotor poles, with each rotor pole including a plurality of rotor slots arranged into a plurality of layers, the plurality of layers including:

a first non-magnetic layer having the rotor retors slots thereof shaped to include a center rotor slot, a first outer rotor slot, and a second outer rotor slot;

a second non-magnetic layer having the rotor slots thereof shaped to include a center rotor slot, a first outer rotor slot, and a second outer rotor slot;

a third magnetic layer having the rotor slots thereof shaped to include a middle rotor slot, a first intermediary rotor slot, a second intermediary rotor slot, a first outside rotor slot, and a second outside rotor slot;

a fourth magnetic layer having the rotor slots thereof shaped to include a middle rotor slot, a first intermediary rotor slot, a second intermediary rotor slot, a first outside rotor slot, and a second outside rotor slot; and a fifth magnetic layer having the rotor slots thereof shaped to include a middle rotor slot, a first intermediary rotor slot, a second intermediary rotor slot, a first outside rotor slot, and a second outside rotor slot;

wherein first and second non-magnetic layers include no magnets;

wherein the third, fourth, and fifth magnetic layers include a magnet in each of the middle rotor slots;

wherein the first outer, second outer, and center rotor slots of the first non-magnetic layers have a first parabolically shaped thickness defined relative to a vertex; and wherein the first outer, second outer, and center rotor slots of the second non-magnetic layers have a second parabolically shaped thickness defined relative to the vertex.

16. A vehicle, comprising:

an electric motor configured for converting electrical power to mechanical power for purposes of propelling the vehicle; and wherein the electric motor includes:

a stator including a plurality of stator windings configured for generating a rotating magnetic field (RMF); and a rotor configured for rotating within the stator according to a torque induced by the RMF, wherein the rotor includes a rotor core having a plurality of circumferentially spaced rotor poles, with each rotor pole including a plurality of rotor slots arranged into one or more magnetic layers and one or more non-magnetic layers, the magnetic layers including a magnet within one or more of the rotor slots thereof and the non-magnetic layers including no magnets within the rotor slots thereof;

wherein:

a centerline of each of the magnetic layers and a centerline of each of the non-magnetic layers radially align with a centerline of the rotor pole corresponding therewith;

an apex of each of the magnetic layers is radially inboard of an apex of each of the non-magnetic layers, wherein the apexes of the magnetic and non-magnetic layers are centered relative to the centerline of the rotor pole corresponding therewith;

each of the rotor poles includes a first non-magnetic layer and a second non-magnetic layer of the non-magnetic layers;

the apex of each of the first non-magnetic layers is outboard of the apex of each of the second non-magnetic layers;

the first non-magnetic layer has the rotors slots thereof shaped to include a first outer rotor slot, a second outer rotor slot, and a center rotor slot;

the second non-magnetic layer has the rotor slots thereof shaped to include a first outer rotor slot, a second outer rotor slot, and a center rotor slot;

the first outer, second outer, and center rotor slots of the first non-magnetic layers have a first parabolically shaped thickness defined relative to a vertex; and the first outer, second outer, and center rotor slots of the second non-magnetic layers have a second parabolically shaped thickness defined relative to the vertex.

* * * * *